(12) United States Patent  
Witzel et al.

(10) Patent No.: US 8,441,360 B2
(45) Date of Patent: May 14, 2013

(54) SEARCH AND RESCUE USING ULTRAVIOLET RADIATION

(75) Inventors: John George Witzel, Alexandria, VA (US); Emmanuel Menilik Negatu, Alexandria, VA (US); Theodore John Vornbrock, Stevensville, MD (US)

(73) Assignee: Raytheon Company, Waltham, MA (US)

( * ) Notice: Subject to any disclaimer, the term of this patent is extended or adjusted under 35 U.S.C. 154(b) by 326 days.

(21) Appl. No.: 12/902,438

(22) Filed: Oct. 12, 2010

(65) Prior Publication Data

US 2011/0068938 A1 Mar. 24, 2011

Related U.S. Application Data

(63) Continuation-in-part of application No. 12/554,527, filed on Sep. 4, 2009, now Pat. No. 8,253,576.

(51) Int. Cl.
*G08B 17/12* (2006.01)

(52) U.S. Cl.
USPC .................. 340/600; 340/573.1; 340/573.6

(58) Field of Classification Search .................. 340/600, 340/573.1
See application file for complete search history.

(56) References Cited

U.S. PATENT DOCUMENTS

| | | | |
|---|---|---|---|
| 2,944,152 A | 7/1960 | Johnson et al. | |
| 3,648,045 A | 3/1972 | Le Vantine et al. | |
| 3,723,745 A | 3/1973 | Fletcher et al. | |
| 3,803,463 A | 4/1974 | Cover | |
| 4,253,132 A | 2/1981 | Cover | |
| 4,376,892 A | 3/1983 | Charpak et al. | |
| 4,493,114 A | 1/1985 | Geller et al. | |
| 4,731,881 A | 3/1988 | Geller | |
| 5,021,668 A | 6/1991 | Talmore et al. | |
| 5,062,154 A | 10/1991 | Geller et al. | |
| 5,191,460 A | 3/1993 | Lapatovich | |
| 5,266,958 A | 11/1993 | Durboraw, III | |
| 5,301,051 A | 4/1994 | Geller | |
| 5,307,194 A | 4/1994 | Hatton et al. | |
| 5,381,098 A | 1/1995 | Loftness | |

(Continued)

FOREIGN PATENT DOCUMENTS

WO  WO 96/38831  12/1996
WO  WO 96/38831 A1  12/1996

(Continued)

OTHER PUBLICATIONS

Notification of Transmittal of the International Search Report and the Written Opinion of the ISA, or the Declaration, PCT/US2010/046285, date of mailing Nov. 12, 2010, 1 page.

(Continued)

*Primary Examiner* — Kerri McNally
(74) *Attorney, Agent, or Firm* — Daly, Crowley, Mofford & Durkee, LLP

(57) ABSTRACT

A system includes an ultraviolet c-band radiation detector to enable detection of radiation during search and rescue operations, at least a portion of the radiation including ultraviolet c-band radiation, and a stimulus generator configured to generate a stimulus in response to detected ultraviolet c-band radiation. Further embodiments may include multiple synchronized ultraviolet c-band detectors to enhance system sensitivity and facilitate detection of relatively weak radiation sources, relatively distant sources, and/or radiation scattered about an environment.

18 Claims, 13 Drawing Sheets

U.S. PATENT DOCUMENTS

| | | | |
|---|---|---|---|
| 5,430,604 A | 7/1995 | Wong | |
| 5,468,963 A | 11/1995 | Bishop | |
| 5,719,567 A | 2/1998 | Norris | |
| 5,886,635 A * | 3/1999 | Landa et al. | 340/573.6 |
| 5,929,788 A * | 7/1999 | Vukosic | 340/908.1 |
| 5,945,912 A * | 8/1999 | Guldbrand | 340/573.1 |
| 6,104,297 A | 8/2000 | Danilychev | |
| 6,380,871 B1 | 4/2002 | Kaplan | |
| 6,693,561 B2 * | 2/2004 | Kaplan | 340/984 |
| 6,954,591 B2 | 10/2005 | Lupton et al. | |
| 7,005,980 B1 * | 2/2006 | Schmidt et al. | 340/539.13 |
| 2001/0029882 A1 | 10/2001 | Pharo et al. | |
| 2002/0104472 A1 | 8/2002 | Neubert | |
| 2003/0079671 A1 | 5/2003 | Ichikawa et al. | |
| 2003/0150371 A1 | 8/2003 | Snider | |
| 2004/0004826 A1 | 1/2004 | Wakaki et al. | |
| 2004/0089219 A1 | 5/2004 | Burau et al. | |
| 2004/0149199 A1 | 8/2004 | Frank et al. | |
| 2005/0078557 A1 | 4/2005 | Andersen | |
| 2005/0125926 A1 | 6/2005 | Rekum et al. | |
| 2005/0139142 A1 | 6/2005 | Kelley et al. | |
| 2005/0160963 A1 | 7/2005 | Siikaluoma et al. | |
| 2005/0217558 A1 | 10/2005 | Fitzer et al. | |
| 2005/0253927 A1 | 11/2005 | Allik et al. | |
| 2005/0270175 A1 | 12/2005 | Peddie et al. | |
| 2006/0065183 A1 | 3/2006 | Drummond et al. | |
| 2006/0164252 A1 | 7/2006 | Richmond | |
| 2006/0169193 A1 | 8/2006 | Mack et al. | |
| 2006/0174812 A1 | 8/2006 | Marszalek et al. | |
| 2006/0260533 A1 | 11/2006 | Parias | |
| 2006/0273087 A1 | 12/2006 | Crawford | |
| 2007/0012237 A1 | 1/2007 | Nielsen | |
| 2007/0044704 A1 | 3/2007 | Osborne et al. | |
| 2007/0098407 A1 | 5/2007 | Hebrank et al. | |
| 2007/0119364 A1 | 5/2007 | Taylor et al. | |
| 2007/0125296 A1 | 6/2007 | Taylor et al. | |
| 2007/0151502 A1 | 7/2007 | Cooperman | |
| 2007/0221863 A1 | 9/2007 | Zipf | |
| 2007/0253713 A1 | 11/2007 | Reilly et al. | |
| 2008/0000411 A1 | 1/2008 | Easterwood | |
| 2008/0022920 A1 | 1/2008 | Custodis | |
| 2008/0092800 A1 | 4/2008 | Smith et al. | |
| 2008/0110391 A1 | 5/2008 | Taylor et al. | |
| 2008/0140314 A1 | 6/2008 | Park | |
| 2008/0150764 A1 | 6/2008 | Glasa et al. | |
| 2008/0190354 A1 | 8/2008 | Malpas et al. | |
| 2008/0198003 A1 * | 8/2008 | Nix | 340/539.13 |
| 2008/0315116 A1 | 12/2008 | Schweitzer | |
| 2009/0010304 A1 | 1/2009 | Skinner et al. | |
| 2009/0145347 A1 | 6/2009 | Nakamura et al. | |
| 2009/0178608 A1 | 7/2009 | Shaw et al. | |
| 2009/0219160 A1 | 9/2009 | Shervey et al. | |
| 2009/0295310 A1 | 12/2009 | Duerr et al. | |

FOREIGN PATENT DOCUMENTS

| | | |
|---|---|---|
| WO | WO 00/23813 A1 | 4/2000 |
| WO | WO 2006/017910 A2 | 2/2006 |
| WO | WO 2006/017910 A3 | 2/2006 |
| WO | WO 2007/008738 A1 | 1/2007 |

OTHER PUBLICATIONS

International Search Report, Form PCT/ISA/210, PCT/US2010/046285, date of mailing Nov. 12, 2010, 3 pages.

Written Opinion of the International Searching Authority, PCT/US2010/046285 date of mailing Nov. 12, 2010, 5 pages.

Final Office Action dated Feb. 3, 2012 for U.S. Appl. No. 12/554,527, filed Sep. 4, 2009, 11 pages.

Response to Final Office Action dated Feb. 3, 2012, for U.S. Appl. No. 12/554,527, filed Sep. 4, 2009, 6 pages.

Notification of Transmittal of the International Search Report dated Dec. 20, 2011, PCT/US2011/052853.

The International Search Report dated Dec. 20, 2011, PCT/US2011/052853.

Written Opinion of the International Searching Authority dated Dec. 20, 2011, PCT/US2011/052853.

Office Action dated Jan. 4, 2012 for U.S. Appl. No. 12/554,527, filed Sep. 4, 2009, 18 pages.

Response to Office Action dated Jan. 4, 2012 with Terminal Disclaimer documents, for U.S. Appl. No. 12/554,527, filed Sep. 4, 2009, 24 pages.

Hamamatsu, Flame Sensor UV Tron® 2868. "Quick Detection of Flame from Distance, Compact UV Sensor with High Sensitivity and Wide Directivity, Suitable for Flame Detectors and Fire Alarms", 1997 Hamamatsu Photonics K.K., pp. 1-2, http://www.acroname.com/robotics/parts/R66-R2868.pdf, last visited Aug 10, 2009.

"Transforming Law Enforcement Safety X26™ Taser®" Taser International, Inc., MBR0005 Rev: A, 2009, 2 pages, http://www.taser.com/SiteCollectionDocuments/Downloads/x26_trifold.pdf, 2 pages, last visited Aug. 12, 2009.

"DayCor® Superb Corona Detection Systems Based on UV Solar Blind Technology" http://www.daycor.com/DayCor-Family/P-superb.html, 2 pages, last visited Aug. 10, 2009.

"SSD110—Solid State Drive", Plasma Technics Inc.®, 70159_cutsheet, 2 pages, http://www.plasmatechnics.com.

"Installation & Operation Manual SSD110/113 Series" Plasma Technics Inc., Version: Rev 2.2, 2006, 32 pages, http://www.plasmatechnics.com.

U.S. Appl. No. 12/538,997, filed Aug. 11, 2009.

U.S. Appl. No. 12/538,997, filed Sep. 4, 2009.

Notice of Allowance dated Mar. 19, 2012 for U.S.Appl. No. 12/554,527, filed Sep. 4, 2009, 9 pages.

* cited by examiner

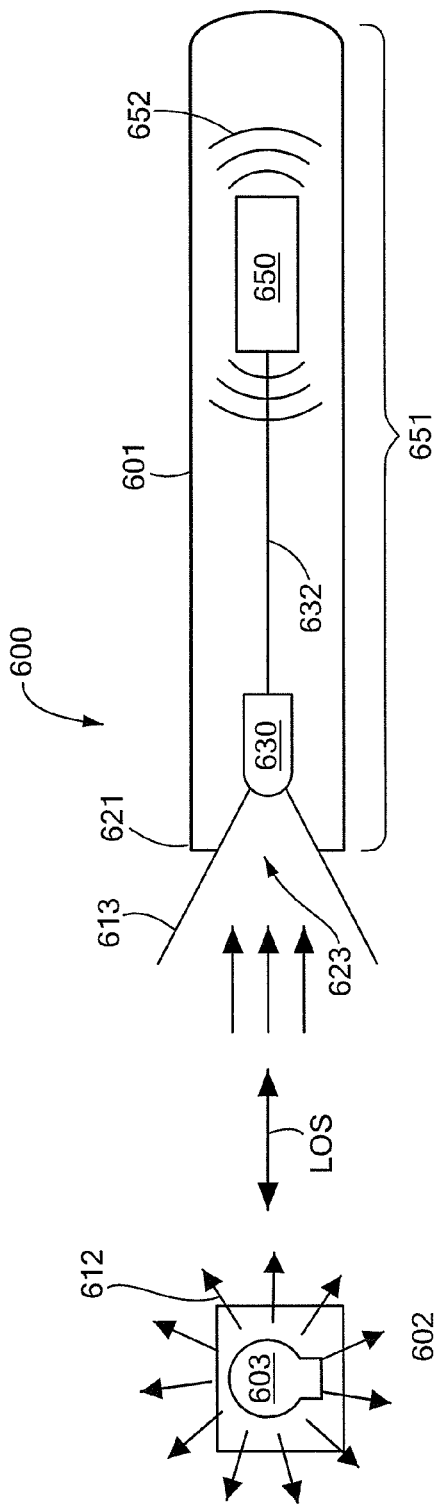
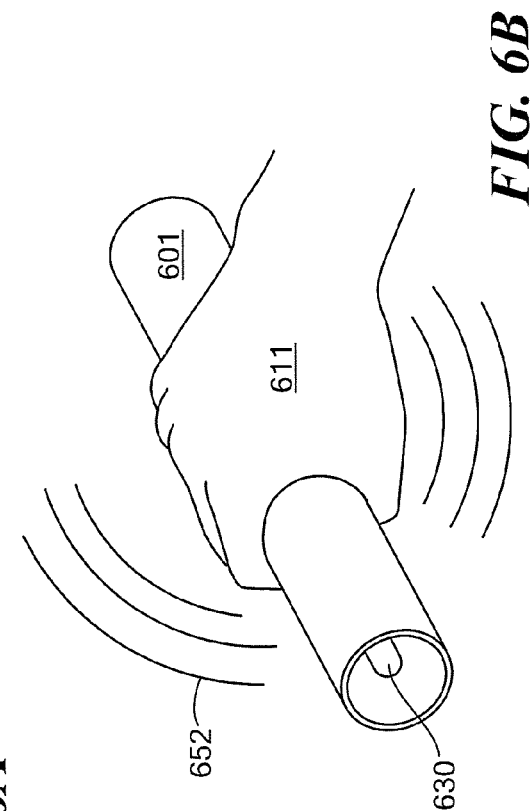
FIG. 6A
FIG. 6B

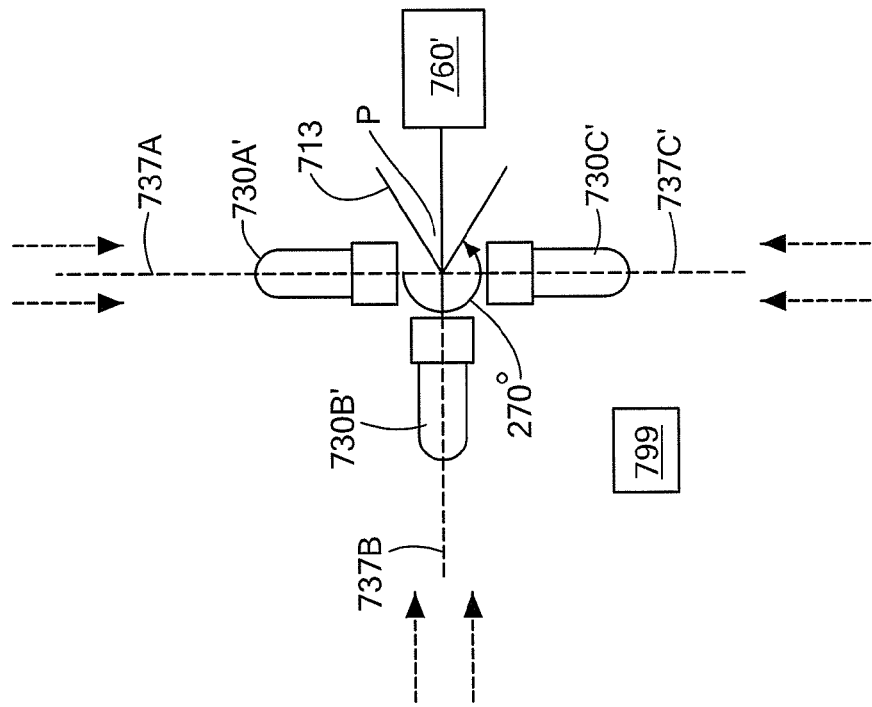
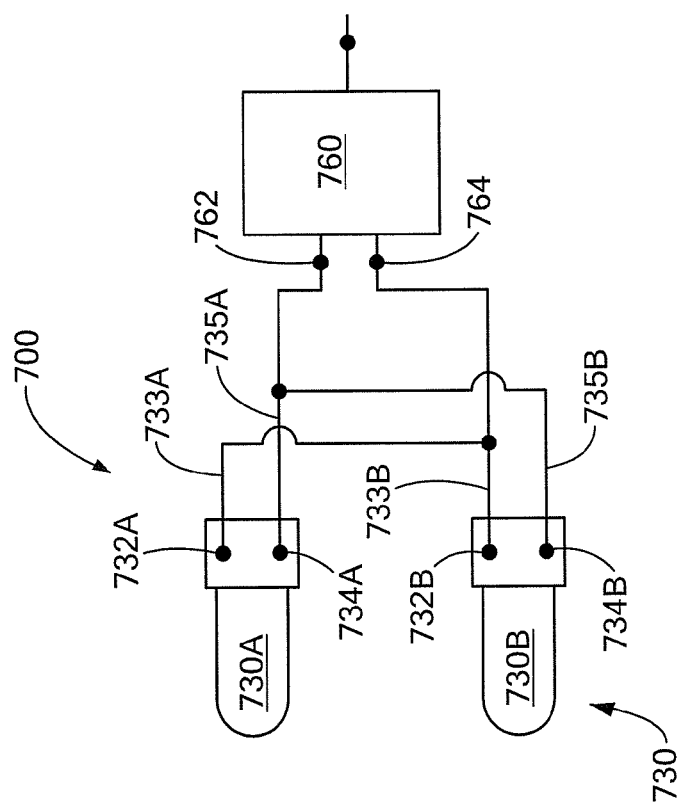
FIG. 8B
FIG. 8A

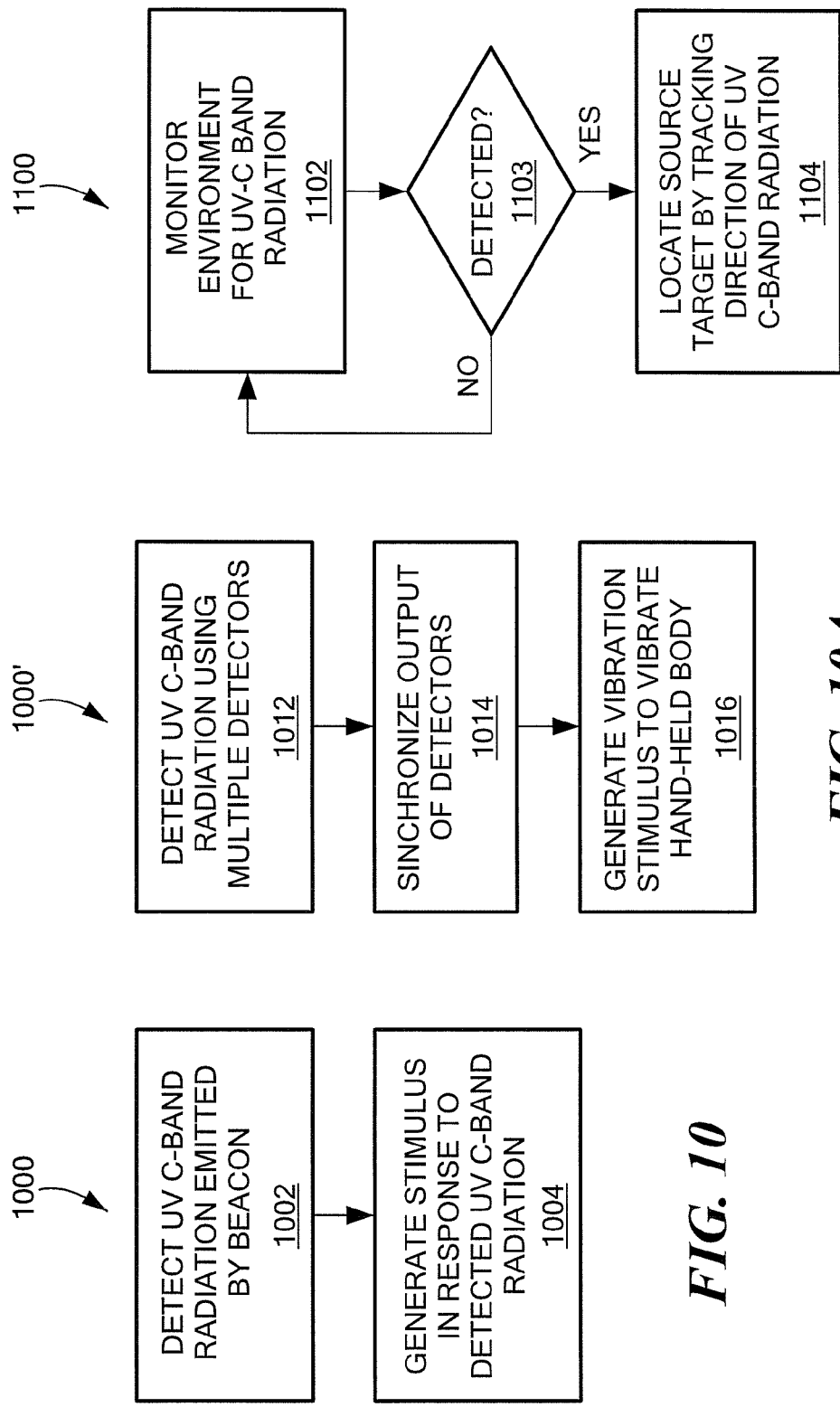

SEARCH AND RESCUE USING ULTRAVIOLET RADIATION

CROSS-REFERENCE TO RELATED APPLICATIONS

This application is a continuation-in-part application of U.S. patent application Ser. No. 12/554,527 entitled "SEARCH AND RESCUE USING ULTRAVIOLET RADIATION," filed on Sep. 4, 2009, which is incorporated herein by reference.

BACKGROUND

As is known in the art, Ultraviolet (UV) light is electromagnetic radiation with a wavelength shorter than that of visible light, but longer than x-rays. UV light includes wavelengths in the range of 100 to 400 nanometers (nm) and energies from 3 to 124 electron-volts. UV light is emitted by the Sun, electric arcs, and artificial light sources such as black lights. As an ionizing radiation, UV sources can cause chemical reactions that cause many substances to glow or fluoresce. Although UV light is beyond visible light, most people are aware of the effects of UV radiation through sunburn. However, the UV spectrum has many other effects, both beneficial and damaging, on human health.

UV radiation can be classified in a number of ways, including as bands of radiation separated into the following:
UV A-band: 400-320 nm;
UV B-band: 320-280 nm; and
UV C-band: 280-100 nm.

The Sun emits UV A, UV B, and UV C-band radiation; however, the Earth atmosphere's ozone layer absorbs about 98.7% of this radiation, primarily in the UV B and UV C-bands. Other natural sources of UV radiation include lightning and fires.

As is also known in the art, ordinary glass is partially transparent to UV A-band radiation, but is opaque to shorter UV wavelengths in the UV B and UV C-bands. Silica or Quartz glass, depending on quality of materials (lack of impurities), can be transparent to UV C-band radiation, while window glass passes about 90% of UV light above 350 nm, but blocks over 90% of UV light below 300 nm.

As is also known in the art, UV C-band radiation is invisible to humans and to ordinary cameras, video gear, and night vision systems. Existing UV detectors generally include either solid-state devices, such as a silicon carbide or aluminum nitride device, or gas-filled tubes as sensing elements. UV detectors are primary used for detecting artificial light. For example, the petrochemical industry uses UV detectors to monitor burning hydrogen flames which radiate strongly in the 185-260 nm range. UV detectors are sensitive to burning compounds, such as hydrocarbons, metals, sulfur, hydrogen, hydrazine, and ammonia. Industrial safety applications employ UV detectors to effectively detect arc-welding, electrical arcs, lighting, and X-rays.

UV C-band cameras have been used to detect invisible coronas emanating from hot spots in high voltage power lines to identify potentially destructive electrical arcs (so called "flash-overs"). These cameras use special quartz or Calcium Fluoride lenses and have split optical paths to process and eventually combine visible and UV light into a visible image. The visible light follows a conventional video-camera path, while the UV light passes through a UV C-band transmissive optical path. The UV light then passes through a solar blind filter into a UV Intensified Charged Coupled Device (ICCD). Image recombination results in invisible UV radiation being rendered as visible light as an overlay on a standard video image. Typically, camera operators can see a bright cloud of UV C-band photons when viewing a UV C-band emissions source through a live UV C-band camera.

SUMMARY

Time is critical during recovery of downed or lost pilots or a man overboard (MOB) at sea, avalanche victims, lost hikers, as well as other recovery scenarios. Success in victim recovery may be measured in minutes due to rapid onset of hypothermia in a victim, exhaustion, drowning, dangerous terrain, or hostile encounters. In poor environmental conditions, rescue teams may fail to locate victims who wear (or are tethered to) search aides that require line-of-sight to locate and track. Moreover, many search aides are nearly impossible to locate and track from relatively large distances in the open ocean, and contact may be lost while rescue vessels come about and attempt to retrace a search.

Strobes are reasonably visible at distances of less than one mile in calm water at night. Unfortunately, strobes are less visible during the day and/or in poor weather when many incidents occur. Also, victims adrift at sea and/or on the move on land (e.g., to avoid dangerous conditions and/or hostile forces in the area) may be lost when rescue teams temporarily lose site of the victims. Ocean currents and winds can further impede efforts, causing lost victims to drift long distances.

UV C-band radiation can be used during search and rescue operations to overcome many of these problems. In particular, because UV C-band detectors are solar blind (the Earth's atmosphere blocks UV C-band radiation) UV C-band radiation can be used in a wide variety of environments, including outdoors and indoors, and day and night. Furthermore, UV C-band radiation is generally unaffected by inclement weather such as rain and fog, and dust and therefore can be used effectively under these otherwise problematic conditions. Another useful feature is that UV C-band radiation reflects well off water, soil, snow, and manmade surfaces, such as pavement and walls.

In general overview, the inventive concepts, techniques, and systems described herein may be used in search and rescue operations to locate and track a lost entity. More particularly, the inventive concepts, techniques, and systems involve the use of a UV C-band detector to locate and track a UV C-band radiation source that may be affixed and/or tethered to a lost victim or asset. The inventive concepts, techniques, and systems may be used to support search and rescue functions and in a way that overcomes many problems experienced in the conventional art.

Advantageously, in environments in which rescues teams much cover relatively large distances (such as to attempt to locate lost victims of a plane crash wherein rescue teams cannot pinpoint the exact location of the crash), the inventive concepts, techniques, and systems enable a lost entity to be located and tracked from relatively large distances. In one embodiment, a low power UV C-band radiation source may be visible for miles in every direction through line-of-sight (i.e. not occluded by any obstacles), reflected, and/or scattered airborne reflections of the radiation.

In a further embodiment, UV C-band radiation may be viewed through a hand-held UV C-band imager. In the same or different embodiment, rescue devices may be adapted to incorporate the inventive systems. For example, strobes which emit visible light in the range of about 400 nanometers (nm) to about 700 nm (such as from light emitting diodes) and/or infrared light above 700 nm may be adapted to incorporate UV C-band radiation sources and the UV C-band imager may be used to speed up and simplify search and rescue efforts. In applications which use strobes, a glass or plastic strobe cover that ordinarily blocks UV C-band radiation may be removed or replaced with another material that does not block strobe-emitted UV C-band radiation. In other instances, a strobe tube material may block UV C-band radiation, which can be replaced with another material that does not block UV C-band radiation.

In one aspect, a system for search and rescue includes a rescue beacon including a radiation source to emit radiation, at least a portion of which includes ultraviolet c-band radiation, and an ultraviolet c-band detector to detect the ultraviolet c-band radiation to enable locating of the rescue beacon.

In further embodiments, the system includes one or more of the following features: the rescue beacon is coupled to a moving body; the radiation source is an omni-directional radiation source; a substantial portion of the radiation is ultraviolet c-band radiation; the radiation source is at least one of: a light-emitting diode, and a gaseous discharge tube; the gaseous discharge tube is Xenon or a Mercury discharge tube; the ultraviolet c-band detector is a one-bit detector; wherein there is a vibration-generator to vibrate in response to detected ultraviolet c-band radiation; the ultraviolet c-band detector is an imager; the imager renders an image to a user, the image including an ultraviolet c-band portion to represent the detected ultraviolet c-band radiation, and a visible light portion to represent an environment of the rescue beacon.

In another aspect, a method for search and rescue includes providing a rescue beacon including a radiation source, at least a portion of which includes ultraviolet c-band radiation, and detecting the ultraviolet c-band radiation using an ultraviolet c-band detector.

Further embodiments of the method include one or more of the following features: the rescue beacon is coupled to a moving body; the radiation source is an omni-directional radiation source; a substantial portion of the radiation is ultraviolet c-band radiation; the radiation source is at least one of: a light-emitting diode, and a gaseous discharge tube; the gaseous discharge tube is Xenon or a Mercury discharge tube; the ultraviolet c-band detector is a one-bit detector; generating a vibration stimulus in response to detected ultraviolet c-band radiation; the ultraviolet c-band detector is an imager; rendering an image to a user, the image including an ultraviolet c-band portion to represent the detected ultraviolet c-band radiation, and a visible light portion to represent an environment of the rescue beacon.

It will readily apparent to one of ordinary skill in the art that the inventive concepts, techniques, and systems are not limited to search and rescue operations. As by way of non-limiting examples, the inventive concepts, techniques, and systems may be used to locate and track moving and/or fixed beacons to support research operations and/or commercial endeavors and/or organizational functions. For example, UV radiation sources may be affixed to weather balloons to support meteorological reporting or to field devices to track commercial assets that may be detected by UV detectors.

BRIEF DESCRIPTION OF THE DRAWINGS

The foregoing features, as well as a detailed description, may be more fully understood from the following description of the drawings in which:

FIG. 6A is a cross-sectional view of an embodiment of a hand-held device according to the inventive concepts, techniques, and systems described herein;

FIG. 6B is a pictorial representation of the hand-held device of FIG. 6A generating a vibration stimulus in a user's hand;

FIG. 8A is a pictorial representation of an embodiment of synchronized detectors coupled to a circuit;

FIG. 8B is a pictorial representation of another embodiment of synchronized detectors having a particular field-of-view;

FIGS. 10-10A are flow diagrams of a method for search and rescue; and

FIG. 11 is a flow diagram of another method for search and rescue including modes of operation.

DETAILED DESCRIPTION

Before embarking on a detailed description of the inventive concepts, techniques, and systems described herein, it may be useful to provide a general overview of search and rescue operations and problems with conventional techniques and search aides such as lifejackets (which may include water-operated strobes lights, clip-on radio frequency devices, etc.) as well as other methods such as smoke signals, whistles, and flares.

Search and rescue efforts to locate victims such as downed pilots and/or a man-overboard (MOB) often experience environmental and procedural impediments. In particular, obstacles and superficial characteristics of a search environment can impede rescue efforts. For example, choppy waves at sea, rugged terrain on land, inclement weather (including rain and fog), and distance can impede a direct line-of-sight from locators to victims that may be necessary to locate victims. Other surface characteristics, such as white caps on waves, can obscure victims, making it particularly difficult for rescue teams to spot victims. Other problems are caused when rescue teams lose sight of victims during so-called "come-about" operations when search vessels reverse direction.

Figure 1:
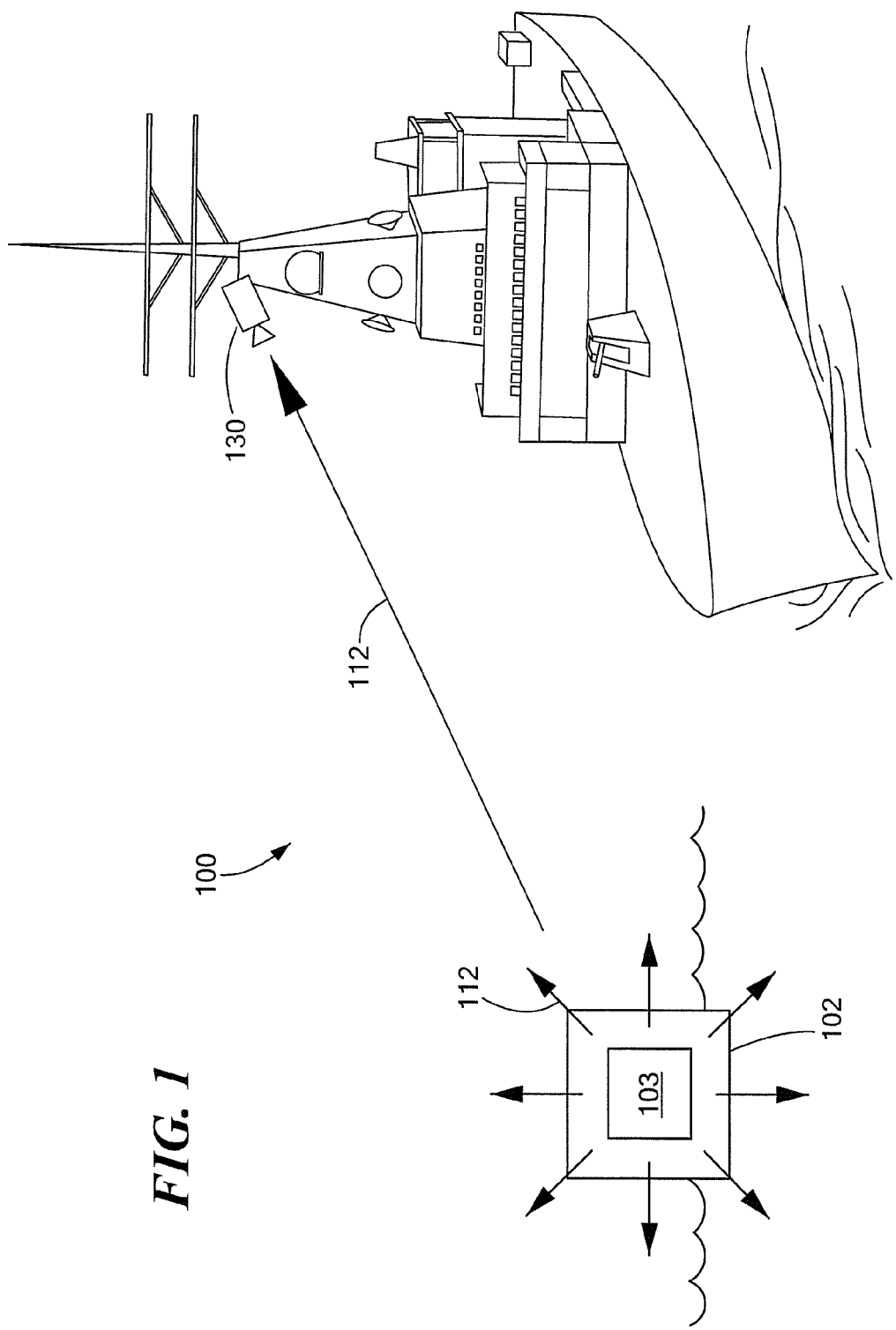
FIG. 1 is a pictorial representation of an embodiment of a search and rescue system according to the inventive concepts, techniques, and systems described herein.

Referring to FIG. 1, in accordance with an embodiment of the inventive concepts, systems, and techniques described herein, a system 100 for search and rescue includes a rescue beacon 102 including a radiation source 103 to emit radiation 112, at least a portion of which includes ultraviolet C-band radiation, and an ultraviolet c-band detector 130 to detect the ultraviolet c-band radiation to enable locating of the rescue beacon 102.

Figure 2:
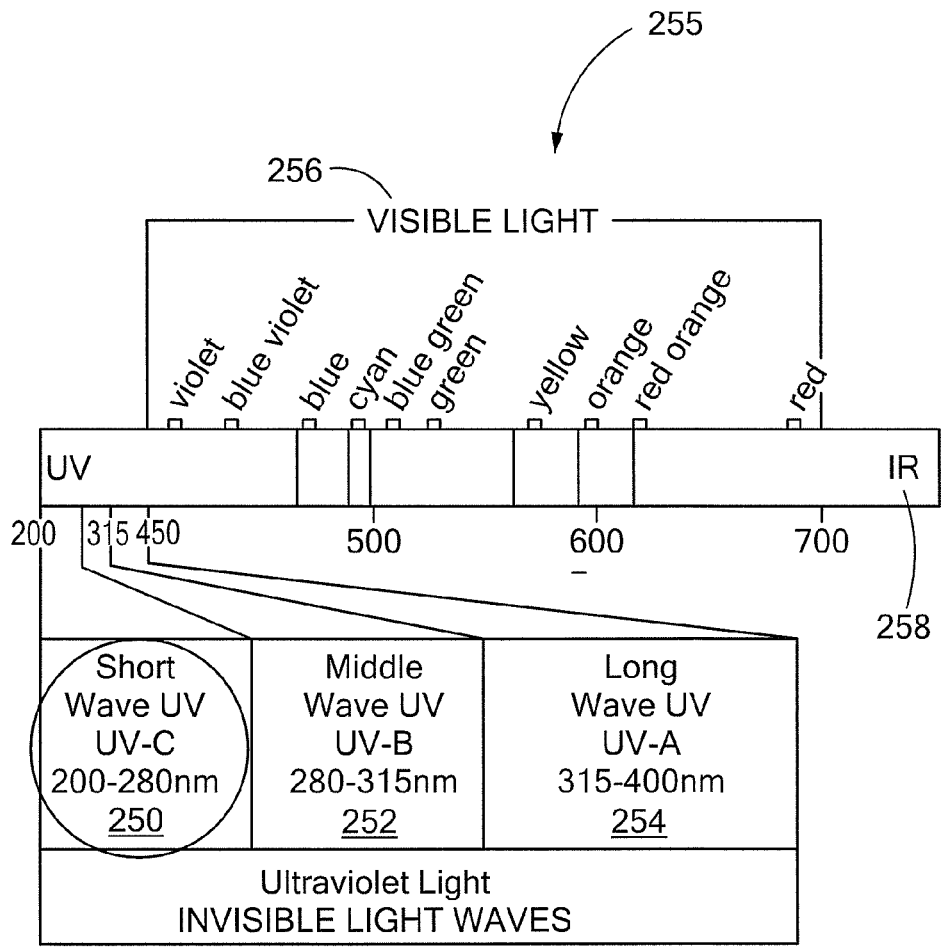
FIG. 2 is pictorial representation of the electromagnetic spectrum a portion of which includes UV C-band radiation.

The ultraviolet c-band radiation source 103 includes a device capable of emitting light, including light in the ultraviolet c-band radiation range. Referring to FIG. 2 illustrating the electro-magnetic spectrum 255, in a further embodiment, a substantial portion of the emitted light (e.g., at least 80% of the emitted light) is within the ultraviolet c-band radiation range 250 of the electro-magnetic spectrum 255 relative to light emitted in a ultraviolet b-band 252, ultraviolet a-band 254, visible range 256, and infrared range 258. As can be seen in FIG. 2, ultraviolet c-band radiation 250 is within the range of about 200 nm to about 280 nm, although it should be noted that ultraviolet c-band radiation 250 may be as low as about 100 nm.

Referring again to FIG. 1, as non-limiting examples, a radiation source 103 may include a solid state device, such as a silicon carbide or aluminum nitride device, or a gas-filled tube. In another non-limiting example, an ultraviolet c-band radiation source 103 may include an ultraviolet c-band light emitting diode or a gaseous low or medium pressure Xenon and/or Mercury discharge tube. Such a tube may include strobe lights which may be low cost and long-lived devices. Other radiation sources include a laser diode and other types of gaseous mixtures in gaseous discharge tubes.

The ultraviolet c-band radiation detector 130 includes a device capable of detecting light, including light in the ultraviolet c-band radiation range. As non-limiting examples, a detector 130 may include a one-bit ultraviolet c-band detector, a non-limiting example of which is the UVTron R2868 manufactured by Hamamatsu Photonics K.K. of Iwata-City, Shizuoka Pref., Japan, capable of detecting light in the range of about 185 nm to about 260 nm. In a further embodiment, the detector 130 includes a ultraviolet c-band imager, a non-limiting example of which is the DayCor© Superb manufactured by Ofil Ltd. of Nes-Ziona, Israel, which is a sensitive bi-spectral visible light and ultraviolet c-band detection apparatus with absolute solar blind performance and with high pinpointing resolution. It will be understood by one of ordinary skill in the art that the detector 130 is not limited to the above-described embodiments and can include other types of ultraviolet c-band radiation detectors.

In a further embodiment, an ultraviolet c-band detector 130 includes a one-bit detector, as may be similar to the one-bit UVTron detector described above, and a vibration-generator to generate a vibration stimulus in response to detected ultraviolet c-band radiation. As by way of a non-limiting example, the vibration-generator may be a vibrating motor. The vibration generator may intensify and/or diminish the vibration stimulus in response to an amount of detected ultraviolet c-band radiation. For example, the vibration stimulus may intensify in response to a relatively intense ultraviolet c-band radiation source.

Such a detector 130 may be included in a hand-held device that vibrates in response to detected ultraviolet c-band radiation. Advantageously, such a detector 130 is relatively simple and low cost, yet can effectively communicate the presence and/or location of ultraviolet c-band radiation to a user. For example, the detector 130 may vibrate when the user points the hand-held device directly at the ultraviolet c-band radiation source 102. In other instances, the detector 130 may vibrate in response to scattered ultraviolet c-band radiation, such as radiation scattered by dust particles, and/or reflected ultraviolet c-band radiation, such as radiation reflected off water. Although scattered and reflected ultraviolet c-band radiation may not indicate a precise source and location of the ultraviolet c-band radiation, it can indicate a general direction of the source to narrow the search space.

In further embodiments, a ultraviolet c-band detector 130 further includes an audio-generator device and/or a visual-generator device to generate respective audio and visual stimuli in response to detected ultraviolet c-band radiation. These devices may further be combined with the above-described vibration-generator device.

Figure 3A:
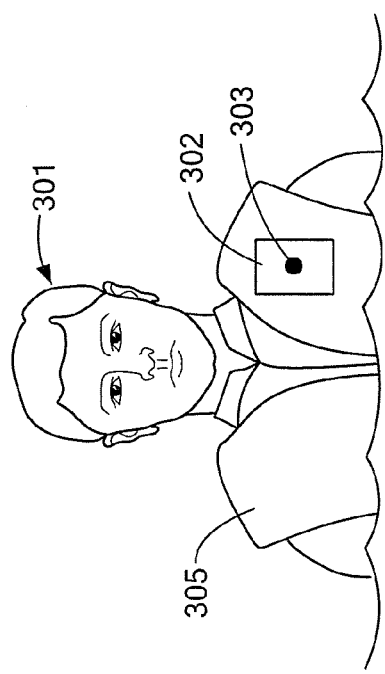
FIG. 3A is a pictorial representation of an embodiment of a rescue beacon according to the inventive concepts, techniques, and systems described herein.
Figure 3B:
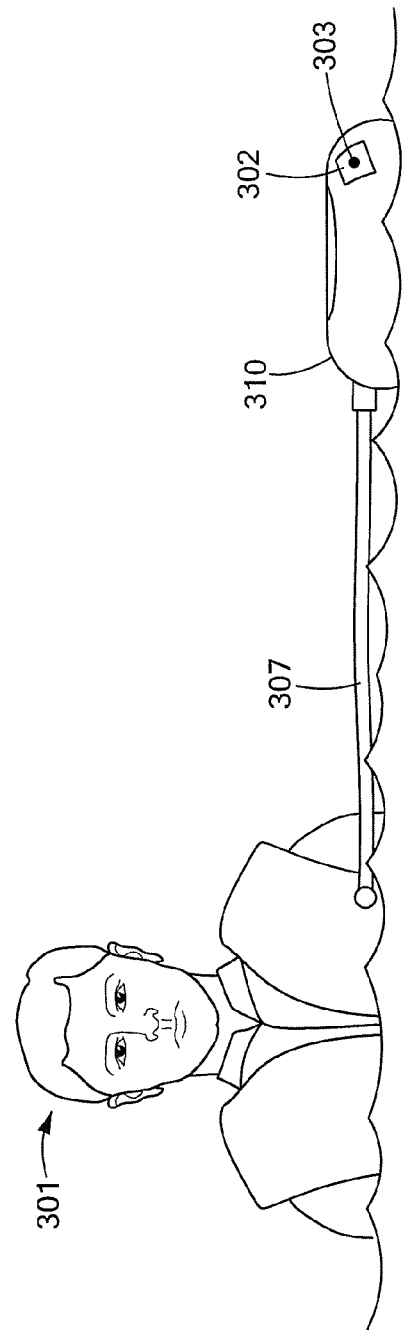
FIG. 3B is a pictorial representation of another embodiment of a rescue beacon according to the inventive concepts, techniques, and systems described herein.

Referring now to FIGS. 3A and 3B, in which like elements have like reference designations, in a further embodiment, a rescue beacon 302 including a ultraviolet c-band radiation source 303, as may be similar to rescue beacon 102 and radiation source 103 described above in conjunction with FIG. 1, is coupled to a lifejacket 305 (FIG. 3A) worn by a victim 301. In other embodiments, the rescue beacon 102 may be coupled to a life ring or throwable man-overboard marker 310 (FIG. 3B), which may be tethered 307 to the victim 301. A variety of methods may be used to couple the rescue beacon 302 to these devices including, but not limited to, providing a mechanical device such as a fastener (non-limiting examples of which include a rivet, clip, staple), or chemically, such as with an epoxy, or a combination thereof.

Figure 3C:
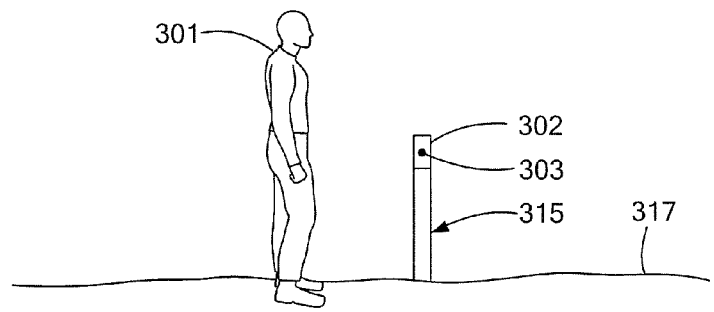
FIG. 3C is a pictorial representation a yet another embodiment of a rescue beacon according to the inventive concepts, techniques, and systems described herein.

Referring to FIG. 3C, in which like elements of FIGS. 3A and 3B have like reference designations, in another embodiment, the rescue beacon 302 is a fixed body. As by non-limiting examples, the rescue beacon may be a pole 315 inserted into the ground 317, a permanent support structure such as a tower, or any other fixed body. In this embodiment, a rescue victim 301 may remain in the vicinity of the rescue beacon 302 so that rescue teams can locate the victim 301.

In another embodiment, the rescue beacon 302 is a moving body. As by way of non-limiting examples, the rescue beacon 302 may be a floatation device that moves along with surface waves, ocean currents, and/or drifts by wind forces, or may be coupled to a moving vehicle or moving lost victim. In the latter, the lost victim may move to avoid hostile forces, to seek shelter, and/or to avoid unsafe environmental conditions (such as steep terrain). In the same or different embodiment, the rescue beacon 302 may be temporarily fixed and move only at certain times or during certain events, for example, due to unstable ground. For example, the rescue beacon 302 may be situated within an unstable snow bank and may temporarily move during an avalanche or due to settling, melting, and/or freezing ice and snow.

Figure 3D:
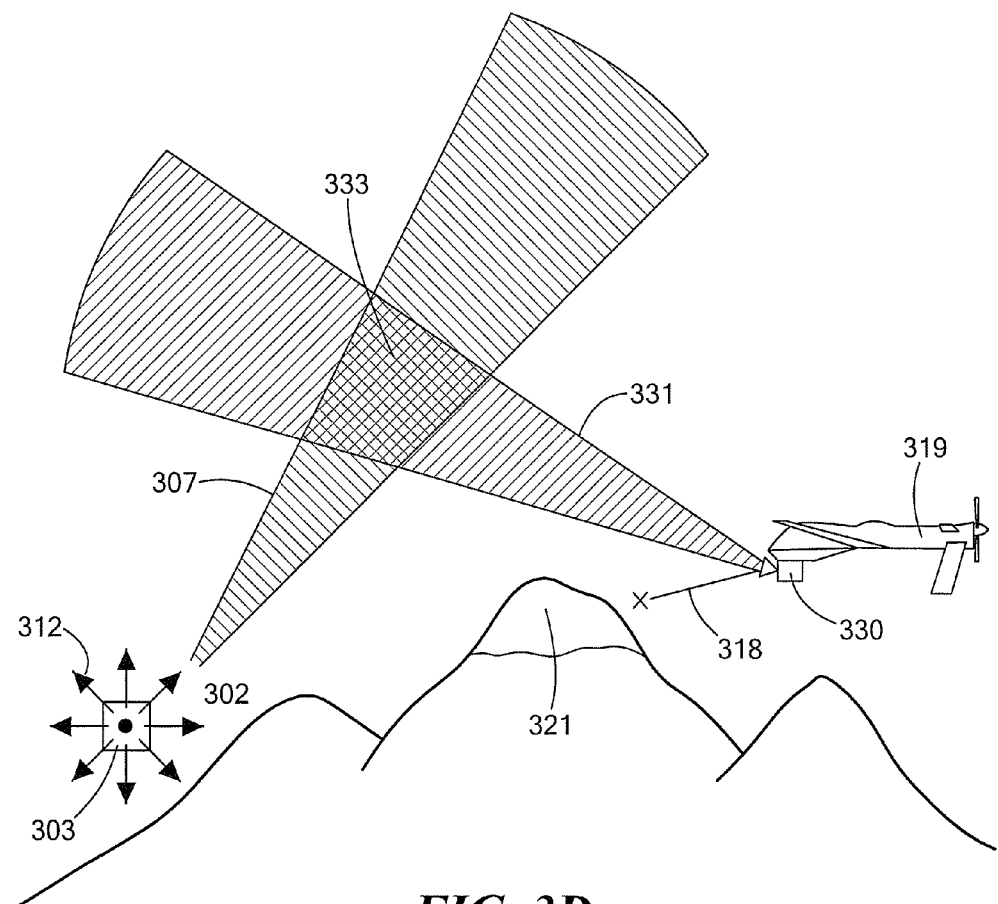
FIG. 3D is a pictorial representation of a search and rescue environment which includes an embodiment of the inventive concepts, techniques, and systems described herein.

Referring now to FIG. 3D, in which like elements of FIGS. 3A and 3B have like reference designations, in a further embodiment, the radiation source 303 is an omni-directional radiation source 312. An omni-directional radiation source is a radiation source that emits light substantially equally in all directions around the source. Advantageously, such a radiation source can be detected from a wide-variety of directions including from a ultraviolet c-band detector mounted on a vehicle that is approaching the radiation source and/or retreating from the radiation source.

When combined with ultraviolet c-band radiation's reflective characteristics, the radiation source 303 may be detected regardless of whether or not the radiation source is within a line-of-sight 318 of a rescue vehicle 319. As can be seen in FIG. 3D, the line-of-sight 318 between the rescue vehicle 319 and the rescue beacon 302 is blocked by a mountain top 321. However, the rescue beacon 302 may be detected as long as a portion of a field-of-view 331 of a ultraviolet c-band detector 330 overlaps 333 with a portion of a field of transmitted ultraviolet c-band radiation 307 from the ultraviolet c-band source 303.

Figure 3E:
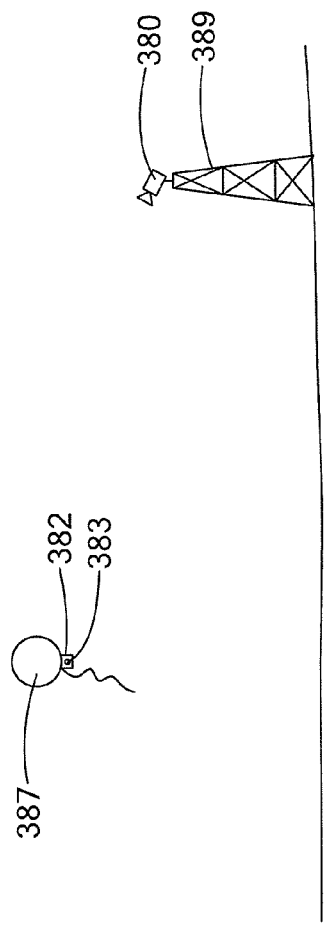
FIG. 3E is a pictorial representation of research environment that may use an embodiment of the inventive concepts, techniques, and systems described herein.

It will be readily apparent to one of ordinary skill in the art that the inventive concepts, techniques, and systems are not limited to applications in search and rescue operations. As by way of non-limiting examples, the inventive concepts, techniques, and systems may be used to locate and track moving and/or fixed beacons to support research operations and/or commercial endeavors and/or organizational functions. Referring now to FIG. 3E, for example, a beacon 382 including a UV radiation source 383 may be affixed to a weather balloon 387 to support meteorological operations. In this example, a UV detector 380 may be mounted to a tower 389. In one or more commercial application, the inventive concepts, techniques, and system may be used to track assets.

Figure 3F:
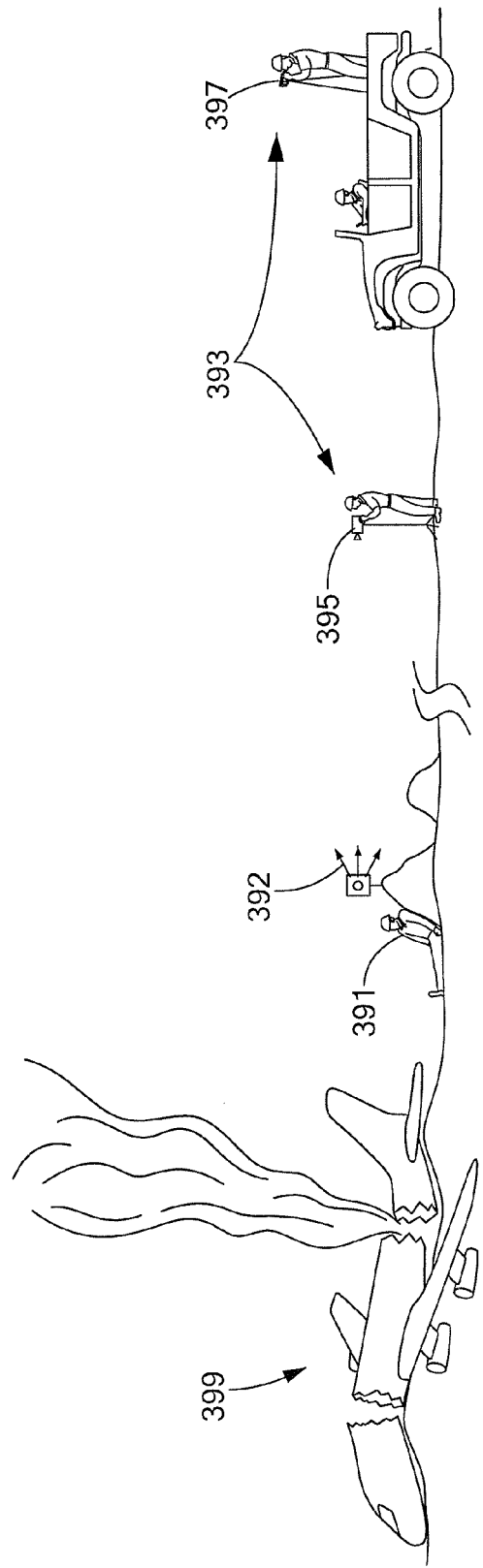
FIG. 3F is a pictorial representation of yet another search and rescue environment that may use an embodiment of the inventive concepts, techniques, and systems described herein.

As described throughout this application, ultraviolet c-band radiation is within the range of about 200 nm to about 280 nm. Referring to FIG. 3F, advantageously, such emitted light 392 cannot be detected by visible light detecting cameras 395 and/or other optical devices including monocular or binocular telescopes 397 often found in the art. In this way, the inventive concepts, techniques, and systems may help thwart hostile forces 393 that typically use these devices 395, 397 to attempt to locate, capture, and/or neutralize a lost or downed victim 391 such as a downed-pilot involved in a plane crash 399.

Figure 4:
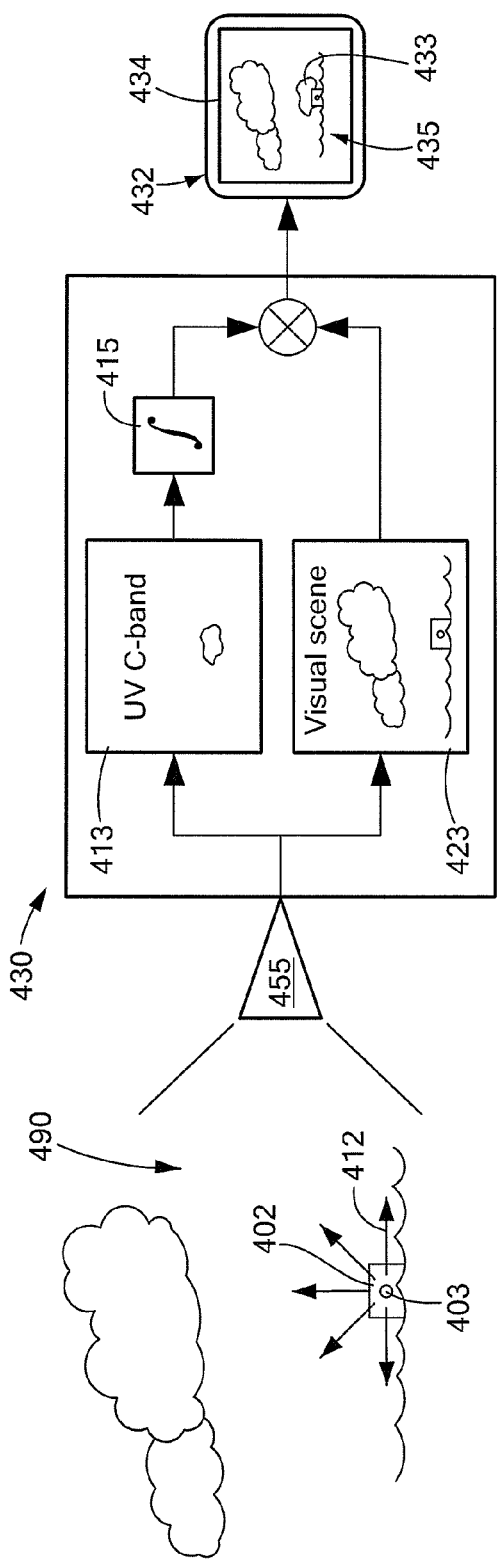
FIG. 4 is a pictorial representation of an embodiment of an ultraviolet (UV) C-band imager of the type which may be used in the system of FIG. 1.

Referring now to FIG. 4, in a further embodiment the inventive concepts, techniques, and systems include an imager 430 capable of detecting ultraviolet c-band radiation 412 emitted by a ultraviolet c-band radiation source 403 and visible light present within an environment 490. The imager 430 generates an image 434 on a display device 432 that includes the detected ultraviolet c-band radiation 413 and the visual scene of the environment 423. The imager 430 may include objective UV and/or zoom lenses, mirrors, and other components, generally denoted by reference numeral 455.

In a further embodiment, the detected ultraviolet c-band image 413 is transformed 415 to appear as a visual component 433 of the displayed image 434 which may overlap other displayed objects 435 present within the environment 490. In this way, rescue teams can locate and track a rescue beacon 402, as may be similar to rescue beacon 102 described in conjunction with FIG. 1.

Figure 5:
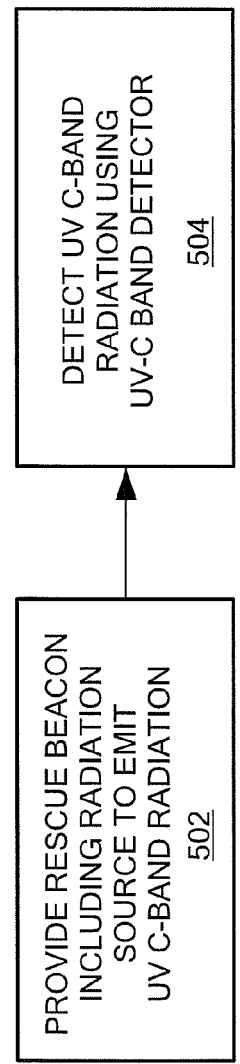
FIG. 5 is a flow diagram of an embodiment of an inventive method described herein for search and rescue.

Referring now to FIG. 5, a method 500 for search and rescue includes providing a rescue beacon 502 which includes an ultraviolet c-band radiation source to emit ultraviolet c-band radiation, and detecting the ultraviolet c-band radiation 504 using an ultraviolet c-band detector. In a further embodiment, the method 500 includes providing a radiation scanner to automatically sweep and monitor a wide search area, for example, a 360 degree search area surrounding a rescue vessel.

In the same or different embodiment, the method 500 includes providing an ultraviolet c-band radiation reflector to reflect ultraviolet c-band radiation from a wide search area to the ultraviolet c-band detector. For example, the ultraviolet c-band reflector may include a mirror capable of reflecting ultraviolet c-band radiation toward the detector. Such a mirror may be rotatably coupled to the above-described scanner to reflect ultraviolet c-band radiation substantially equally from all directions toward the detector.

Referring now to FIG. 6A, in another embodiment, system 600 for search and rescue operations includes ultraviolet c-band radiation detector 630 (as may be the same or similar to ultraviolet c-band detector 130 described in conjunction with FIG. 1) to enable detection of radiation and stimulus generator 650 configured to generate a stimulus (generally designated by reference numeral 652) in response to detected ultraviolet c-band radiation. System 600 can be used to detect ultraviolet c-band radiation emitted by radiation sources. In some embodiments, ultraviolet c-band radiation detector 630 is configured to detect radiation (a substantial portion of which includes ultraviolet c-band radiation) emitted from rescue beacon 602. Rescue beacon 602 includes radiation source 603 configured to emit ultraviolet c-band radiation (generally designated by reference numeral 612).

In some embodiments, detector 630 includes a photoelectric gas discharge detector. Advantageously, photoelectric gas discharge detectors are solar blind (i.e., insensitive to radiation bands outside of ultraviolet c-band radiation) and do not require any additional filtering to remove some radiation, such as visible light.

Stimulus 652 can include, but is not limited to, a somatosensory stimulus, an audio stimulus, a visual stimulus, or a combination thereof. A variety of methods may be used to generate stimulus 652. For example, an audio stimulus may be generated using a vibrating diaphragm to produce sound waves, a visual stimulus may be generated using a light emitting diode, etc.

Ultraviolet c-band radiation detector 630 is responsive to ultraviolet c-band radiation 612 and provides output signal 632 representative of said response to stimulus generator 650. Stimulus generator 650 processes output signal 632 and renders visual, somatosensory, and/or auditory stimulus 652 to be sensed by a user. In this way, the user is alerted to the presence of ultraviolet c-band radiation 612 in an environment and, more particularly, the presence of ultraviolet c-band radiation source 603 of search and rescue beacon 602. The detected ultraviolet c-band radiation may emanate from sources other than the search and rescue beacon (or it may be from one of a group of search and rescue beacons), however, due to the rarity of naturally occurring ultraviolet c-band radiation sources, it is likely that any detected ultraviolet c-band radiation emanates from search and rescue beacon 602.

In one particular embodiment, system 600 is used to scan an environment to locate ultraviolet c-band radiation source 603. In such embodiments, stimulus generator 650 may render stimulus 652 at various intensities depending on strength/weakness of radiation 612 received from radiation source 630, which may be affected by a distance of radiation source 603 from detector 630, and/or an orientation of detector 630 relative to radiation source 603. In some embodiments, system 600 may be mounted to a rotating shaft driven by a motor and/or to a rotatable tripod shaft to automate scanning of the environment.

Referring now to FIG. 6B and again to FIG. 6A, in one particular embodiment, system 600 includes hand-held device 601 for housing ultraviolet c-band radiation detector 630 and stimulus generator 650. A user holds hand-held device 601, which in some embodiments includes an elongated body 651, permitting the user to sense stimulus 652.

In some embodiments, stimulus 652 includes a vibration stimulus used to vibrate hand-held device 601 to notify a user. System 600, however, should not be construed as limited to such embodiments. As by way of non-limiting examples, other types of stimulus-generating devices include those incorporated into clothing (e.g., a vibrator incorporated into a vest), coupled to portable devices and equipment (e.g., an audio beeper mounted to a backpack), etc.

Some embodiments may include an electro-mechanical vibrator including an electric motor coupled to a driveshaft with an unbalanced mass. Here, the unbalanced mass produces oscillating mechanical energy as it spins on the driveshaft which vibrates hand-held device 601.

Figure 6C:
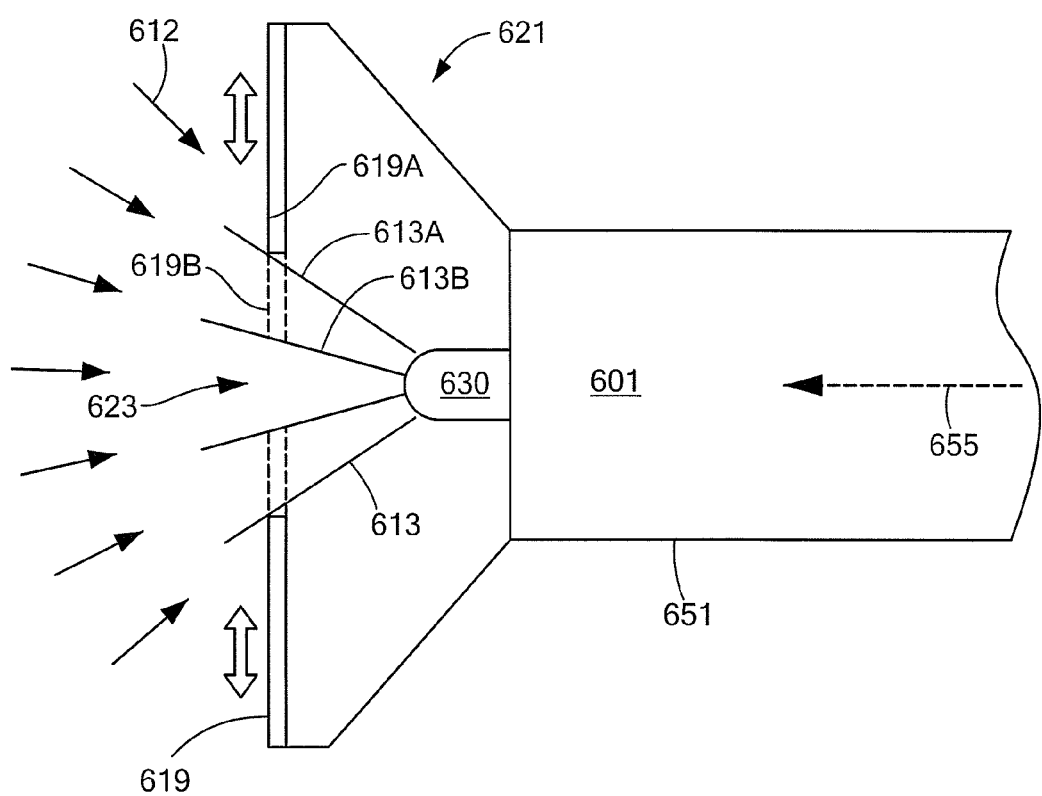
FIG. 6C is a close-up cross-sectional view of another embodiment of the hand-held device of FIG. 6A.

Referring now to FIG. 6C showing a close-up side view of an embodiment of system 600 and again to FIG. 6A, in some embodiments hand-held device 601 includes elongated body 651 having an end 621 defining an opening 623 to pass ultraviolet c-band radiation 612 to detector 630. Elongated body 651 includes aperture mechanism 619 that expands (619A) and contracts (619B) to control the size of opening 623 (which may be referred to as an aperture), thereby respectively increasing and decreasing field-of-view 613 (as designated by reference numerals 613A and 613B) of detector 630. In still other embodiments, elongated body 651 expands in a radial direction and towards end 621 to accommodate aperture mechanism 619 and/or to increase a range of field-of-view 613.

Advantageously, system 600, in one configuration, may be used to detect ultraviolet c-band radiation 612 scattered about the environment and emanating from ultraviolet c-band radiation source 603 as well as determine a direction of ultraviolet c-band radiation source 603 relative to a location of a user holding hand-held device 651. For example, aperture 623 may be expanded so that detector 630 may detect ultraviolet c-band radiation 612 from a wide range of angles relative to a user. Upon detecting ultraviolet c-band radiation 612, in another configuration, aperture 623 may be contracted to narrow field-of-view 613 of detector 630 to facilitate locating of ultraviolet c-band radiation source 603. Such a combination of system 600 configurations can significantly aid in search and rescue operations, as well as in applications in which it is desired or necessary to detect, track, and/or locate objects.

In further embodiments, ultraviolet c-band radiation detector 630 renders a binary result (i.e., a first result or a second result) corresponding to a presence (or, alternatively, an absence) of ultraviolet c-band radiation 612. Stimulus generator 650 receives the binary result and in response generates stimulus 652 corresponding to a presence of ultraviolet c-band radiation 612.

In other embodiments, ultraviolet c-band radiation detector 630 is configured to render a range of values corresponding to levels of detected ultraviolet c-band radiation 612. Stimulus generator 650 receives the rendered value and in response generates a stimulus proportional to the rendered value. For example, stimulus generator 650 may generate a relatively strong stimulus (e.g., strong vibrations) or a relatively weak stimulus (e.g., weak vibrations or no vibrations) proportional to the rendered value.

Figure 7:
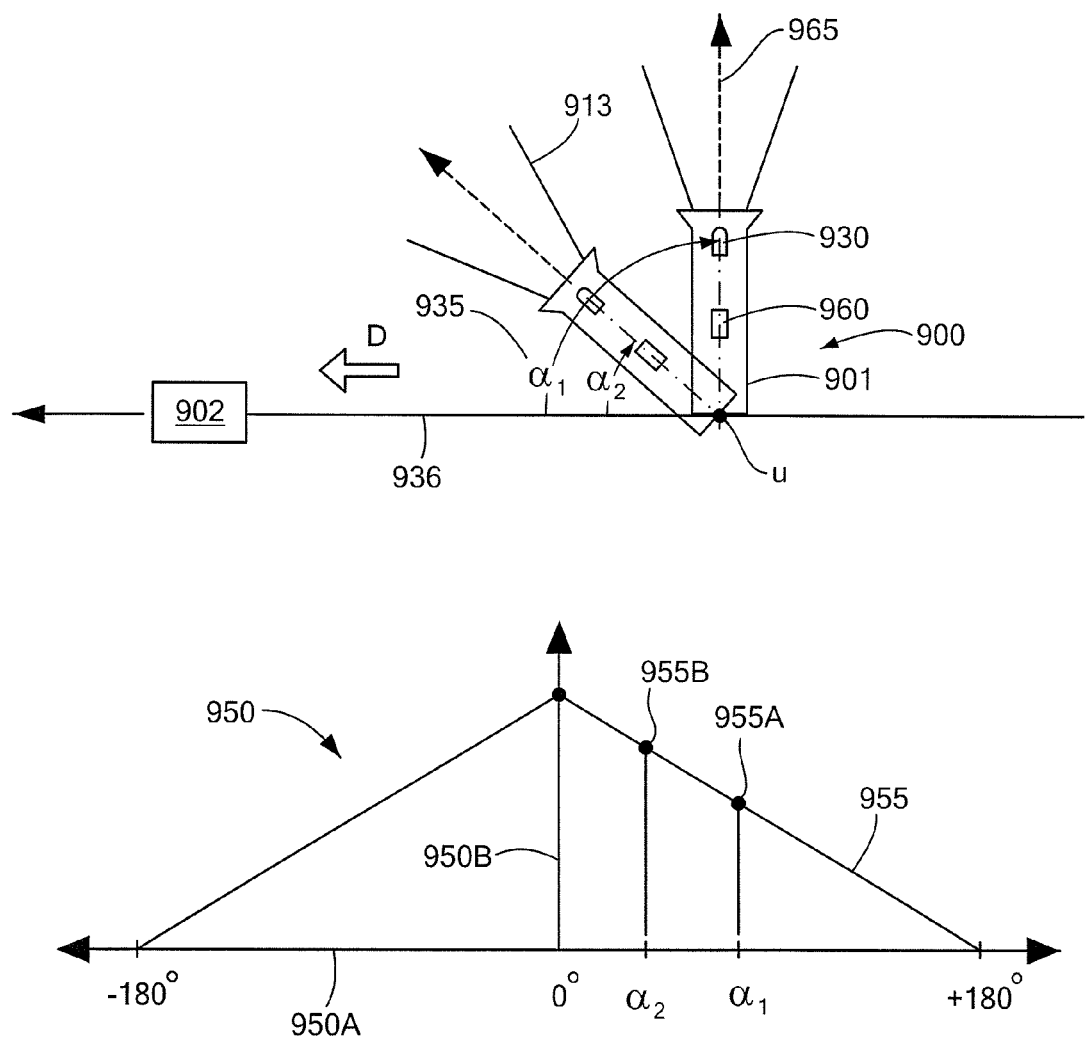
FIG. 7 is a pictorial representation of an ultraviolet c-band detector having a narrow field-of-view and a graph illustrating a particular response behavior of the detector as the detector is rotated toward a radiation source.

Referring now to FIG. 7, in a further embodiment, stimulus generator 960 of system 900 renders stimulus corresponding to an angle (generally designated by reference numeral 935) between an axis 936 representative of a direction D of search and rescue beacon 902 relative to user position represented by point U and a field-of-view 913 of ultraviolet c-band radiation detector 930. Field-of-view 913 represents a view area within which detector 930 receives ultraviolet c-band radiation and may be centered about a longitudinal axis 965 of elongated hand-held body 901.

Graph 950 representing a response 955 of system 900 to detected ultraviolet c-band radiation has a horizontal axis 950A representing angle 935 within a range of −180 degrees-+180 degrees and a vertical axis 950B representing stimulus intensity (in arbitrary units) generated by stimulus generator 960. As can be seen in FIG. 7, as system 900 is rotated about point U towards search and rescue beacon 902 from angle $\alpha_1$ to $\alpha_2$ (i.e., from approximately 90 degrees to 45 degrees, where axis 936 represents 0 degrees, i.e., alignment of direction D and longitudinal axis 965), stimulus generator 960 generates correspondingly more intense stimulus represented from point 955A to point 955B of response 955. In this way, system 900 may be used to determine direction D of search and rescue beacon 902 relative to user position U by tracking system 900 (e.g., by holding and moving system 900) and receiving a dynamic response 955. Response 955 need not be linearly related to angle 935 as shown in FIG. 7, and may include other types of response behaviors such as those tending to accentuate response 955 (e.g., response exponentially related to angle 935) and/or to attenuate response 955.

Referring now to FIG. 8A, in a further embodiment, system 700 includes at least two ultraviolet c-band detectors (for example, first ultraviolet c-band radiation detector 730A and second ultraviolet c-band radiation detector 730B). First and second ultraviolet c-band radiation detectors 730A, 730B are coupled to circuit 760. Circuit 760 synchronizes first and second ultraviolet c-band radiation detectors 730A, 730B. In some embodiments, first ultraviolet c-band radiation detector 730A includes a first photoelectric gas discharge detector and second ultraviolet c-band radiation detector 730B includes a second photoelectric gas discharge detector. First and second photoelectric gas discharge detectors are coupled to circuit 760 to synchronize gas charge and discharge of detectors 730A, 730B.

In one particular embodiment, first ultraviolet c-band radiation detector 730A includes output port 732A at which is provided first output signal 733A and output port 734A at which is provided second output signal 735A. First and second output signals 733A, 735A may be representative of respective cathode electrode and anode electrode signals of detector 730A and are proportional to ultraviolet c-band radiation received at detector 730A.

Second ultraviolet c-band radiation detector 730B includes output port 732B at which is provided third output signal 733B and output port 734B at which is provided fourth output signal 735B. Third and fourth output signals 733B, 735B may be representative of respective cathode electrode and anode electrode signals of detector 730B and are proportional to ultraviolet c-band radiation received at detector 730B.

First input 762 of circuit 760 is responsive to coupled second and fourth output signals 735A, 735B (i.e. cathode electrode signals) and second input 764 of circuit 760 is responsive to coupled first and third output signals 733A, 733B (i.e. anode electrode signals). In this way, respective output signals (733A, 735A, 733B, 735B) of detectors 760A, 760B can be said to be synchronized.

Advantageously, such a configuration can enhance system 700 sensitivity and reliability by reducing and/or eliminating interference from gas discharge emissions from out-of-sync detectors. Furthermore, two or more ultraviolet c-band radiation detectors (e.g., detectors 730A, 730B) can provide increased surface area for detecting radiation which can increase system 700 sensitivity. Accordingly, system 700 can be used to detect ultraviolet c-band radiation over relatively large distances and/or emitted from relatively weak radiation sources. Moreover, detectors (e.g., detectors 730A, 730B) can be arranged to receive radiation from a variety of desired directions and with a range of viewing fields, for example, over a 360 degree field-of-view, 270 degree field-of-view, etc.

Other benefits of multiple synchronized ultraviolet c-band radiation detectors include a reduction in electrical noise which may result in more reliable, accurate detection. For example, each detector 730 can exhibit electrical noise at least a portion of which is caused by thermal effects in detector electrodes. However, because each detector 730 is excited by statistically uncorrelated thermal effects, a sum of the electrical noise components from each detector 730 can be reduced and/or minimized (i.e., one portion of the electrical noise components are instantaneously higher than the mean-zero, and other portion of the electrical noise components are instantaneously lower than the mean-zero). The sum of the electrical noise components can therefore, on average, be up to 3 dB lower for each doubling of the number of detectors 730. For example, two ultraviolet c-band radiation detectors 730 can reduce the thermally-induced component of the electrical background noise by up to 3 dB compared to a single ultraviolet c-band radiation detector, four ultraviolet c-band radiation detectors 730 can reduce the electrical background noise by up to 6 dB, eight ultraviolet c-band radiation detectors 730 can reduce the electrical background noise by up to 9 dB, etc.

In one particular detector arrangement shown in FIG. 8B in which first detector 730A', second detector 730B', and third detector 730C' are coupled synchronously to circuit 760', first detector 730A' is disposed in plane 799 parallel to first direction 737A to provide directional sensitivity to radiation received from first direction 737A, second detector 730B' is disposed in plane 799 parallel to second direction 737B orthogonal to first direction 737A to provide directional sensitivity to radiation received from second direction 737B, and third detector 730C' is disposed in plane 799 parallel to third direction 737C opposing first direction 737A to provide directional sensitivity to radiation received from third direction 737C. In this way, first, second, and third detectors 730A', 730B', 730C' can provide detector field-of-view 713 approximately equal to 270 degrees about alignment point P.

Figure 8C:
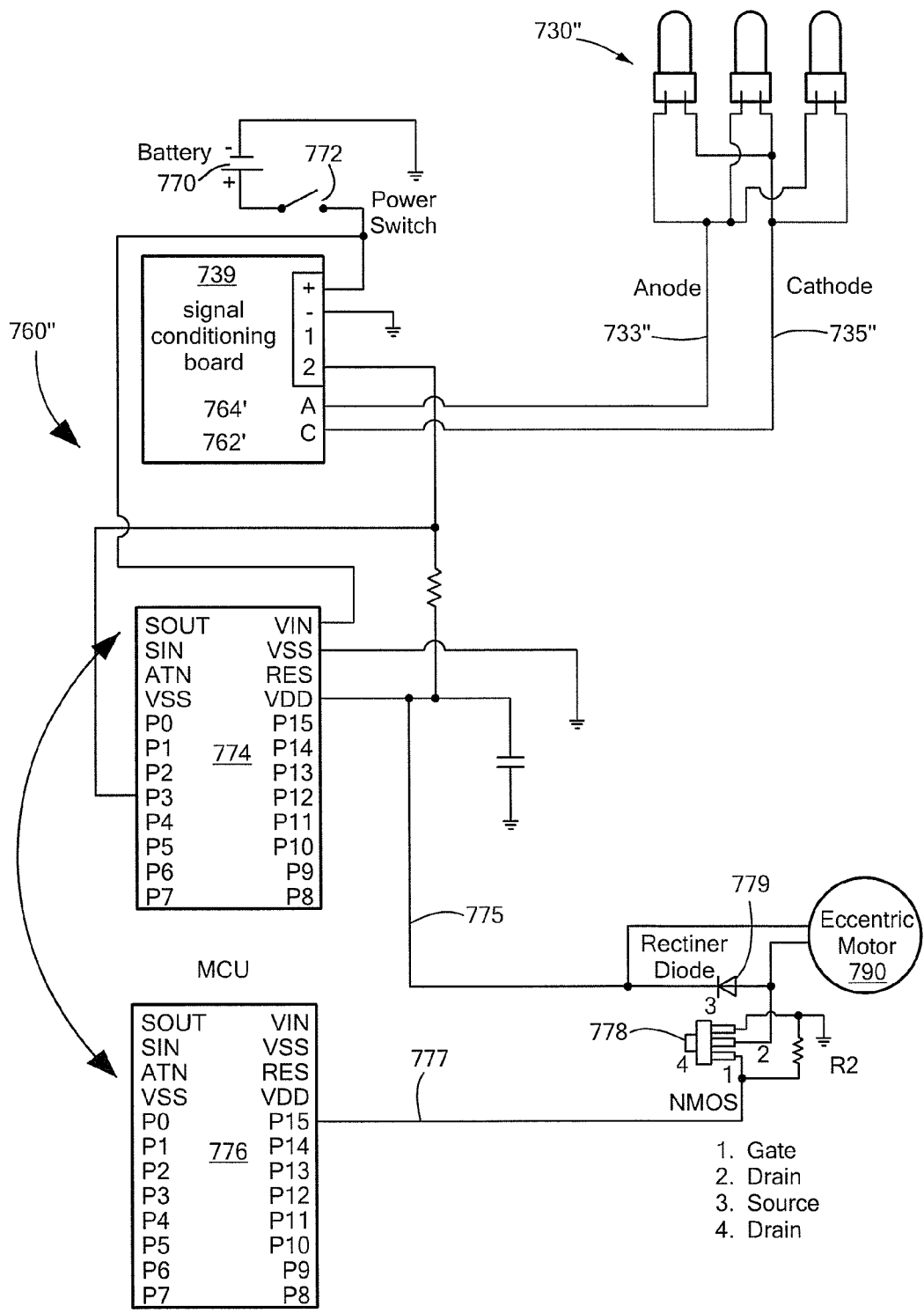
FIG. 8C is a circuit diagram of yet another embodiment of synchronized detectors and a vibrating motor.

Referring now to FIG. 8C, in one particular embodiment of synchronized detectors (generally represented by reference numeral 730"), circuit 760" coupled to detectors 730" includes signal conditioning board 739 configured to receive coupled anode signals 733" and coupled cathode signals 735" at respective input ports 764' and 762'. It should be noted that although three ultraviolet c-band detectors 730" are shown in FIG. 8C, of course, any number of ultraviolet c-band detectors may be used according to the needs of a particular application.

Circuit 760" may be coupled to battery 770 or other power sources to provide power and power switch 772 to activate/deactivate circuit 760". Microcontroller unit (MCU) 774 and/or pulse-width modulator (PWM) unit 776 may be coupled to signal conditional board 739. MCU and PWM units are configured to generate output control signals 775, 777 to control a speed of vibrating motor 790 thereby producing vibrations which may be sensed by a user. Circuit 760" may use additional components, such as NMOS 778 and/or one or more rectifier diodes 779.

Figure 9A:
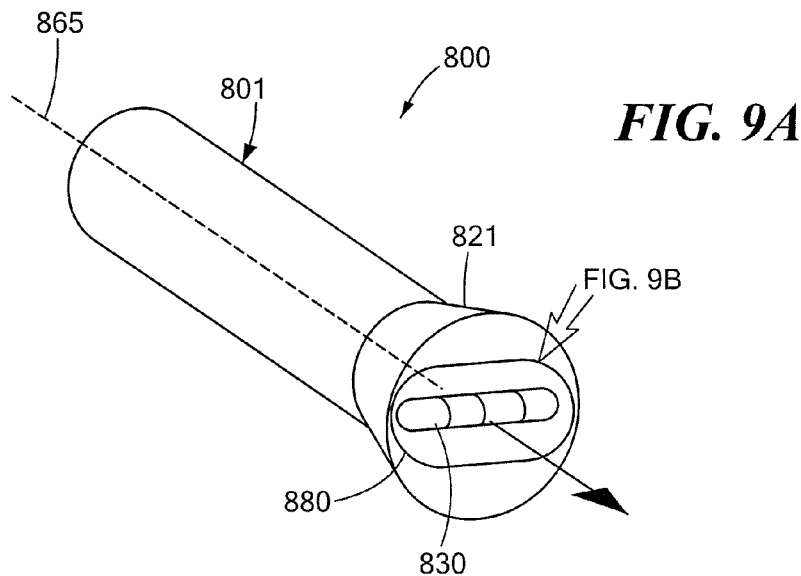
FIG. 9A is a pictorial representation of an embodiment of a reflector for an ultraviolet c-band detector.
Figure 9B:
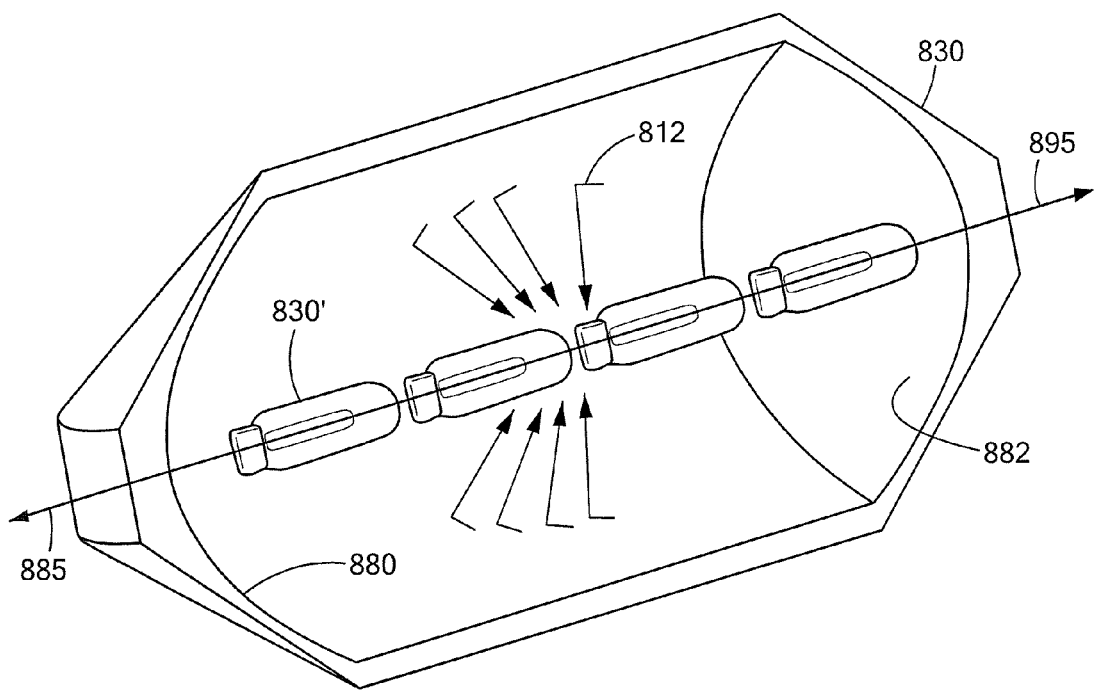
FIG. 9B is a close-up view of an embodiment of the reflector of FIG. 9A.

Referring now to FIG. 9A, in further embodiments, system 800 includes reflector 880 to reflect ultraviolet c-band radiation incident thereon in proximity to ultraviolet c-band radiation detector 830. In some embodiments, reflector 880 is disposed at end 821 of elongated body 801. FIG. 9B shows a close-up view of one particular embodiment of reflector 880 having concave reflecting surface 882 that reflects (and focuses) received ultraviolet c-band radiation 812 in proximity to one or more ultraviolet c-band detectors (generally represented by reference number 830') which are arranged along an axis of alignment 895. Reflector 880 may be elongated orthogonally to a longitudinal axis 865 of elongated body 801. Advantageously, reflector 880 provides relatively large reflecting surface 882 for receiving and focusing radiation in proximity to multiple detectors 830, which can enhance system 800 sensitivity.

It should be noted, however, that system 800 is not limited to four detectors 830 and reflector 880 of the type shown in FIG. 9A, but may include any number of detector/reflector configurations to suit particular application needs. For example, certain configurations may enhance detection of relatively small amounts of radiation, radiation scattered about the environment, and/or radiation from a relatively narrow field-of-view (e.g., to pinpoint a location of radiation source). These configurations may include reflectors having convex surfaces or a group of reflectors having concave and/or convex surfaces.

Referring now to FIG. 10, in one aspect, a method of search and rescue 1000 includes, in step 1002, detecting ultraviolet c-band radiation emitted by a search and rescue beacon and, in step 1004, generating a stimulus in response to detected ultraviolet c-band radiation to notify a user.

Referring now to FIG. 10A, in further embodiment, method 1000' includes, in step 1012, detecting ultraviolet c-band radiation using multiple detectors and, in step 1014, synchronizing the output of the detectors (which may include photoelectric gas discharge detectors) to reduce, minimize, and/or eliminate interference between detectors.

In the same or different embodiment, method 1000' includes, in step 1016, generating a vibration stimulus to vibrate a hand-held device. A magnitude of the vibration stimulus may correspond to an angle between an axis representative of the direction of a search and rescue beacon relative to a user location and a field-of-view of one or more ultraviolet c-band radiation detectors.

Referring now to FIG. 11, in some embodiments, a method 1100 includes, in step 1102, detecting ultraviolet c-band radiation scattered about an environment and generating a stimulus in response to detected scattered radiation. This may be associated with a passive listening mode in which a detector monitors an environment for any ultraviolet c-band radiation emitted by a target search and rescue beacon. Once detected at decision box 1103, the detector may alert/notify a user.

In step 1104, a location of the search and rescue beacon is determined by actively moving and tracking ultraviolet c-band radiation using a detector with a narrow search view (i.e., a narrow field-of-view). This may be referred to as an active engaged mode in which it is desired to locate (and possibly retrieve) the search and rescue beacon. A stimulus generator may generate a stimulus having a magnitude corresponding to how close the field-of-view of the detector matches the direction of the search and rescue beacon.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A system, comprising:
   an ultraviolet c-band radiation detector to enable detection of radiation during search and rescue operations, at least a portion of the radiation including ultraviolet c-band radiation, and
   a stimulus generator configured to generate a stimulus in response to detected ultraviolet c-band radiation; wherein the ultraviolet c-band radiation detector comprises:
      a first ultraviolet c-band radiation detector;
      a second ultraviolet c-band and radiation detector; and
      a circuit for synchronizing the first and second ultraviolet c-band radiation detectors.

2. The system of claim 1, wherein the ultraviolet c-band radiation detector is a photoelectric gas discharge detector.

3. The system of claim 1, wherein the stimulus includes at least one of: a somatosensory stimulus, an audio stimulus, or a visual stimulus.

4. The system of claim 3, wherein the somatosensory stimulus includes a vibration stimulus.

5. The system of claim 1, further comprising:
   a body for housing the ultraviolet c-band radiation detector and the stimulus generator, wherein the stimulus generator is configured to vibrate the body in response to detected ultraviolet c-band radiation emitted by a search and rescue beacon, a magnitude of the vibration corresponding to a direction of the search and rescue beacon relative to a longitudinal axis of the body.

6. The system of claim 1, further comprising
   a rescue beacon comprising:
      a radiation source to emit the radiation.

7. The system of claim 6, wherein the radiation source is an omni-directional radiation source.

8. The system of claim 1, further comprising:
   an elongated body for housing the ultraviolet c-band radiation detector and the stimulus generator, the ultraviolet c-band radiation detector disposed at an end of the elongated body.

9. The system of claim 8, further comprising:
   a reflector disposed at the end of the elongated body in proximity to the ultraviolet c-band detector, the reflector for reflecting ultraviolet c-band radiation incident thereon in proximity to the ultraviolet c-band detector.

10. The system of claim 9, wherein the first and second ultraviolet chard detectors disposed along an axis at which the reflector focuses the ultraviolet c-band radiation.

11. A hand-held device, comprising:
    an ultraviolet c-band radiation detector to enable detection of radiation during search and rescue operations, at least a portion of the radiation including ultraviolet c-band radiation;
    a stimulus generator configured to generate a stimulus in response to detected ultraviolet c-band radiation; and
    an elongated body for housing the ultraviolet c-band radiation detector and the stimulus generator,
    wherein the stimulus generator is configured to vibrate the elongated body in response to detected ultraviolet c-band radiation;
    wherein the ultraviolet c-band radiation detector comprises:
       a first ultraviolet c-band radiation detector;
       a second ultraviolet c-band radiation detector; and
       a circuit coupled to the first and second ultraviolet c-band radiation detectors, wherein the circuit synchronizes the first ultraviolet c-band radiation detector and the second ultraviolet c-band radiation detector.

12. The hand-held device of claim 11, wherein the stimulus generator is configured to vibrate the elongated body in correspondence to a direction of a source emitting the ultraviolet c-band radiation relative to a longitudinal axis of the elongated body.

13. A method of search and rescue, comprising:
    detecting ultraviolet c-band radiation emitted by a search and rescue beacon; and
    generating a stimulus in response to detected ultraviolet c-band radiation to notify a user;
    wherein the ultraviolet c-band radiation is detected using a first ultraviolet c-band radiation detector and a second ultraviolet c-band radiation detector, further comprising:
    synchronizing the first and second ultraviolet c-band radiation detectors.

14. The method of claim 13, wherein the ultraviolet c-band radiation is detected using a photoelectric gas discharge detector.

15. The method of claim 13, wherein generating a stimulus comprises:
    generating a vibration stimulus to vibrate a hand-held device.

16. The method of claim 13, wherein detecting ultraviolet c-band radiation further comprises:
    enabling determination of a direction of the search and rescue beacon relative to a user position.

17. The method of claim 16, wherein the stimulus generator renders the stimulus corresponding to an angle between an axis representative of the direction of the search and rescue beacon relative to the user position and a field-of-view of an ultraviolet c-band radiation detector.

18. The method of claim 17, wherein the field-of-view of the ultraviolet c-band radiation detector is oriented along a longitudinal axis of an elongated body used to house the ultraviolet c-band radiation detector.

* * * * *